(12) United States Patent
Collier et al.

(10) Patent No.: US 11,844,314 B1
(45) Date of Patent: Dec. 19, 2023

(54) SOD ROLL STACKING TECHNIQUE

(71) Applicant: FireFly Automatix, Inc., Salt Lake City, UT (US)

(72) Inventors: David Collier, Mapleton, UT (US); Daniel A. Aposhian, West Valley City, UT (US); Eric E. Aston, Farmington, UT (US); Steven R. Aposhian, Farmington, UT (US)

(73) Assignee: FireFly Automatix, Inc., Salt Lake City, UT (US)

( * ) Notice: Subject to any disclaimer, the term of this patent is extended or adjusted under 35 U.S.C. 154(b) by 0 days.

(21) Appl. No.: 17/886,866

(22) Filed: Aug. 12, 2022

(51) Int. Cl.
*A01G 20/15* (2018.01)
*B65G 61/00* (2006.01)
*B65G 57/22* (2006.01)

(52) U.S. Cl.
CPC ............. *A01G 20/15* (2018.02); *B65G 57/22* (2013.01); *B65G 61/00* (2013.01)

(58) Field of Classification Search
CPC ........ A01G 20/15; B65G 57/03; B65G 61/00; B65G 57/186; B65G 57/24; B65G 57/22; B65G 57/26; Y10S 414/116
See application file for complete search history.

(56) References Cited

U.S. PATENT DOCUMENTS

| | | | | |
|---|---|---|---|---|
| 2,841,433 | A * | 7/1958 | Pagdin | B65G 57/04 414/792.8 |
| 3,618,790 | A * | 11/1971 | Carmody | B65G 57/04 414/792.9 |
| 5,004,401 | A * | 4/1991 | Tsubone | B65G 57/26 414/802 |
| 6,540,063 | B1 * | 4/2003 | Fallas | B65B 5/105 198/460.1 |
| 7,066,277 | B2 * | 6/2006 | Hendriks | A01G 20/15 172/19 |
| 8,997,438 | B1 * | 4/2015 | Fallas | B25J 9/0093 901/17 |
| 9,078,390 | B2 * | 7/2015 | Aposhian | A01G 20/15 |
| 9,258,937 | B2 * | 2/2016 | Aposhian | B25J 9/1676 |
| 9,363,937 | B2 * | 6/2016 | Aposhian | B65B 5/105 |
| 10,743,479 | B2 * | 8/2020 | Brouwer | A01G 20/10 |
| 2006/0102363 | A1 * | 5/2006 | Tvetene | A01G 20/15 172/20 |
| 2009/0162181 | A1 * | 6/2009 | Ryf | B65G 57/03 414/788.1 |
| 2010/0228385 | A1 * | 9/2010 | Beck | B65G 1/1378 715/777 |
| 2020/0354167 | A1 * | 11/2020 | Koenig | B65H 45/04 |
| 2021/0214173 | A1 * | 7/2021 | Aston | B65G 57/14 |

* cited by examiner

*Primary Examiner* — Gregory W Adams
(74) *Attorney, Agent, or Firm* — Kirton McConkie; Brian Tucker

(57) ABSTRACT

Sod harvesters can be configured to stack rolls of sod in unique layers on a pallet. A sod harvester can include control circuitry that is configured to operate a stacking head and a stacking conveyor in a manner that enables the layers to be formed. The structure of the layers can facilitate harvesting wider rolls even when narrower pallets are used to transport the rolls.

20 Claims, 15 Drawing Sheets

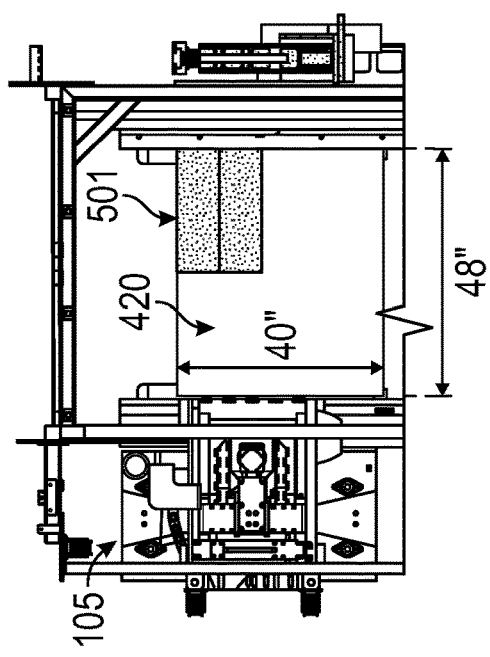
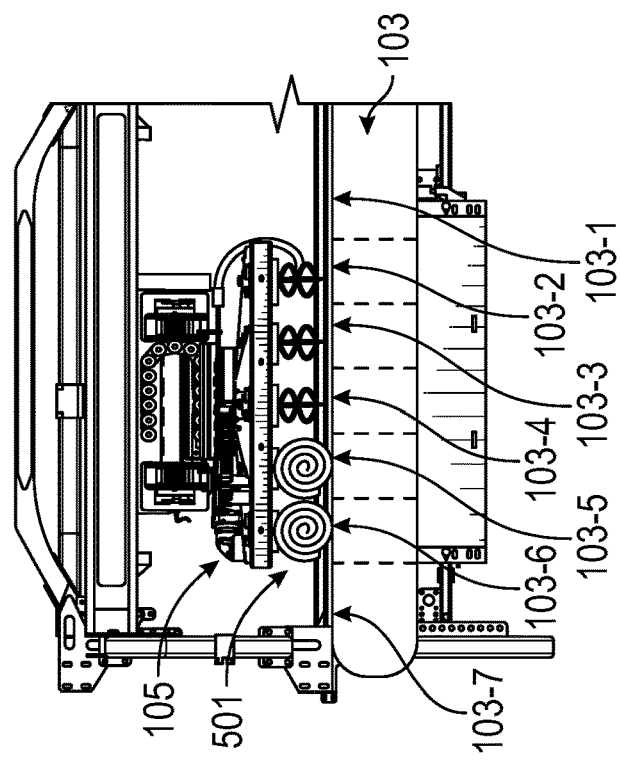
FIG. 6B
FIG. 6A

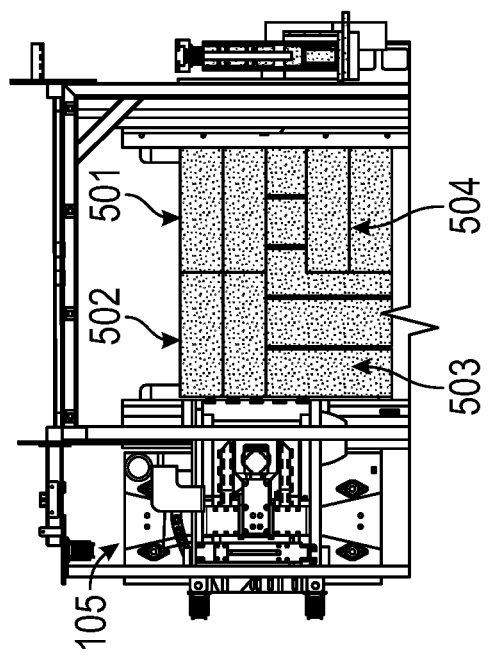
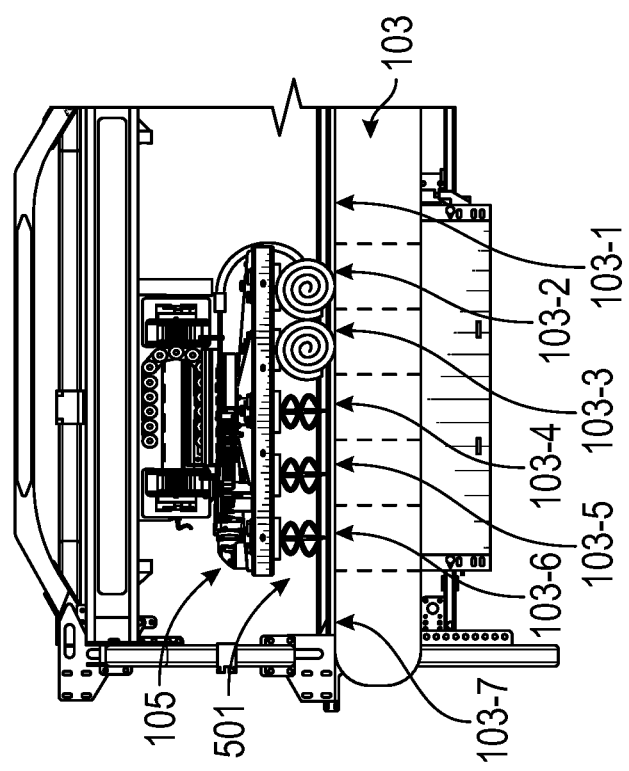
FIG. 6H
FIG. 6G

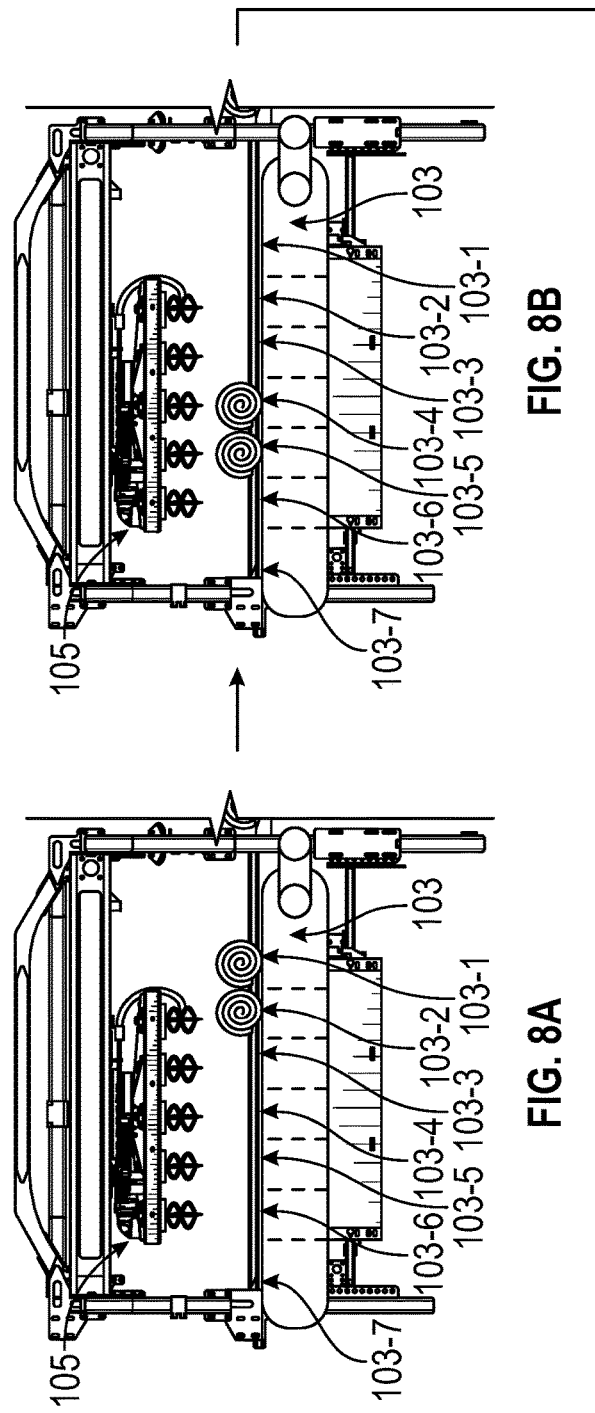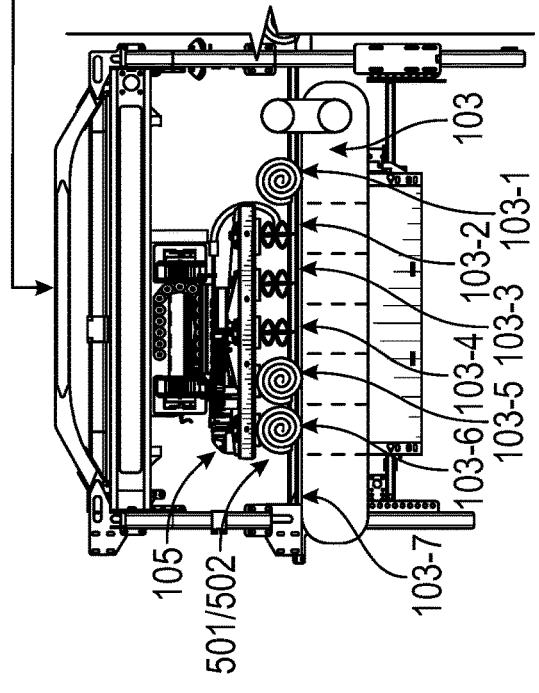

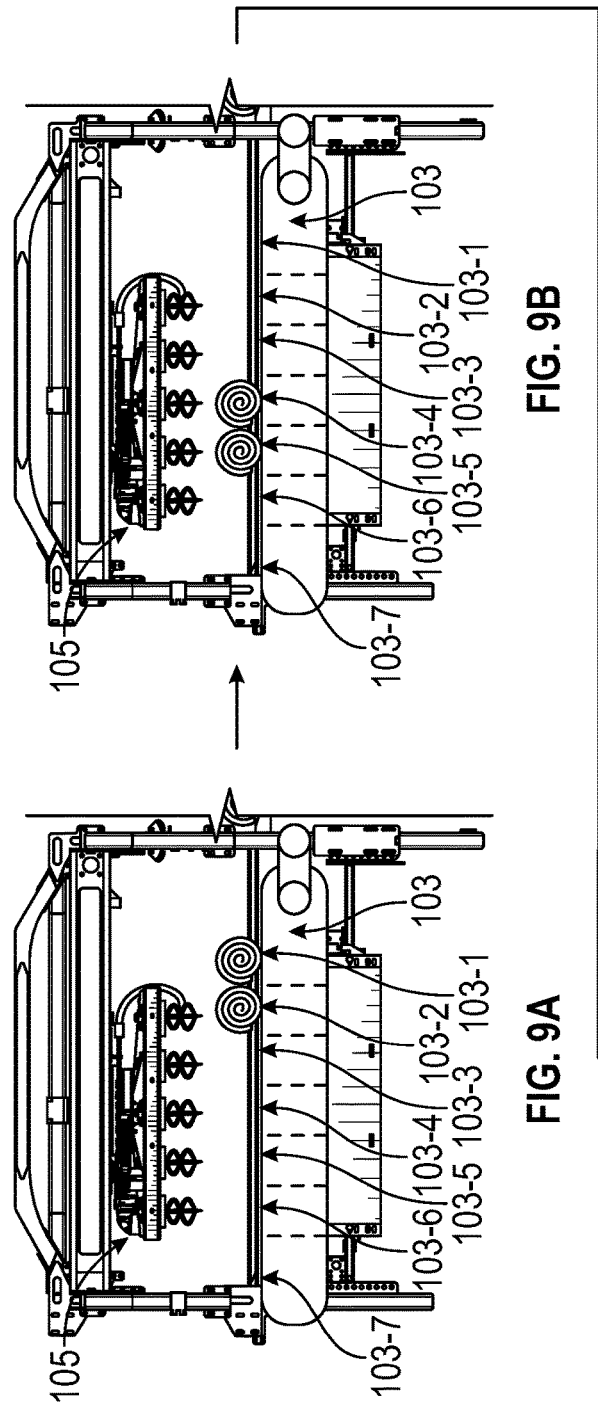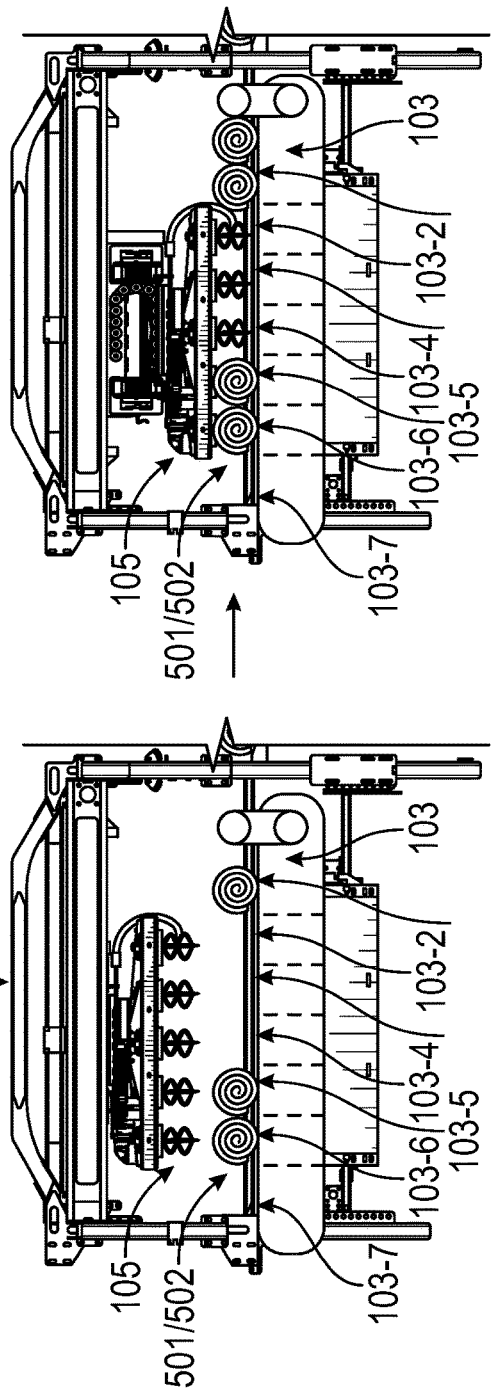

SOD ROLL STACKING TECHNIQUE

CROSS-REFERENCE TO RELATED APPLICATIONS

N/A

BACKGROUND

Turf grass (sod) is a living organism that must be handled properly to ensure its survival when it is removed from one location and transplanted to another. Sod is generally harvested using large machinery such as sod harvester 100 shown in FIG. 1. Sod harvester 100 is in the form of a tractor and includes a cutting head 101 that cuts slabs of sod from the ground, inclined conveyor(s) 102 that elevate the slabs from the ground towards a stacking conveyor 103, a stacking head 105 that is mounted to a support mechanism 104, and a pallet dispenser 106 that is positioned adjacent a pallet support (not visible) on which stacking head 105 stacks slabs that it has removed from stacking conveyor 103.

Two general types of harvesters exist: slab harvesters and roll harvesters. A roll harvester forms the slabs of sod into rolls which are then accumulated on the stacking conveyor for pick up. A slab harvester, on the other hand, directly stacks the slabs in their flat form. Sod harvester 100 in FIG. 1 represents a slab harvester.

FIG. 2 provides an example where sod harvester 100 is a roll harvester. In addition to the components shown in FIG. 1, sod harvester 100 in FIG. 2 includes a roll forming mechanism 108 that is positioned above inclined conveyor(s) 102 and configured to deliver rolls onto stacking conveyor 103. Many different types of roll forming mechanisms could be used. In the embodiment represented in FIG. 2, stacking conveyor 103 and stacking head 105 are configured to enable up to five rolls to be stacked in a single stacking operation (i.e., the process of removing rolls from the stacking conveyor and releasing them on a pallet). Stacking conveyor 103 includes seven roll slots 103-1 through 103-7 in which rolls could be positioned on stacking conveyor 103. In some scenarios, such as the depicted scenario, stacking conveyor 103 may be configured to advance a set of five rolls into roll slots 103-2 through 103-6 from which stacking head 105 may pick up and stack the five rolls on a pallet positioned on pallet support 107. Roll slot 103-7 may enable stacking conveyor 103 to be advanced before or during a pickup operation. For example, while stacking head 105 is securing the set of five rolls, stacking head 105 and stacking conveyor 103 may be advanced in unison so that the set of five rolls are picked up from roll slots 103-3 through 103-7. This can enable stacking conveyor 103 to be advanced to receive another roll before the set of five rolls are picked up from stacking conveyor 103.

FIG. 3 provides an example of how stacking head 105 may be configured. Stacking head 105 includes five sets of roll securing mechanisms 105-1 through 105-5. U.S. Pat. No. 11,304,386 describes such a stacking head. However, other types of stacking heads could be used.

When rolls are stacked on a pallet, it is common to orient the rolls in each layer with a 90-degree offset relative to the adjacent layers. This orientation of the rolls facilitates forming pallets that are stable and minimizes the likelihood that a roll may fall off the pallet. FIG. 4 illustrates two different sizes of pallets that may be used to stack sod. Pallet 410, which is approximately 48 inches (1.2 meters) by 48 inches (1.2 meters), is commonly used in the United States. Pallet 420, which is approximately 48 inches (1.2 meters) by 40 inches (1.0 meter), is commonly used in the United Kingdom to match the narrower truck/trailer widths used there. Because pallet 410 has a square shape, each layer can include the same number of rolls without causing the rolls to extend over the edge of pallet 410. This is not the case with pallet 420 due to its rectangular shape. For example, if the same layer configuration is used on both the 48-inch dimension and the 40-inch dimension, the rolls stacked on the 40-inch dimension will extend beyond the edge of pallet 420. This may also cause the rolls to extend beyond the edge of the truck or trailer on which they may be transported and is therefore unsafe.

U.S. Pat. No. 11,111,088 describes stacking techniques that could be used to stack rolls on pallet 420 or other non-square pallets. Such stacking techniques are typically used when the roll width is 16 inches because three groups of rolls (3×16=48) can be accommodated across the 48-inch dimension. However, when stacking on the narrower 40-inch dimension, two groups of rolls are spaced apart to create a gap in which one or more perpendicular rolls can be positioned. The techniques of U.S. Pat. No. 11,111,088 cannot be used when the roll width is greater than 16 inches—at least without causing the rolls to extend over the edges of pallet 420. Yet, for efficiency purposes, both during harvesting and installation, wider rolls, such as 24-inch rolls, are typically preferred.

BRIEF SUMMARY

The present invention extends to sod harvesters that are configured to stack rolls of sod in unique layers on a pallet and to methods for stacking rolls of sod in unique layers on a pallet. A sod harvester can include control circuitry that is configured to operate a stacking head and a stacking conveyor in a manner that enables the layers to be formed. The structure of the layers can facilitate harvesting wider rolls even when narrower pallets are used to transport the rolls.

In some embodiments, the present invention may be implemented as a sod harvester that includes a pallet support assembly that is configured to support a pallet, a stacking conveyor that is configured to receive rolls of sod, a stacking head that is configured to pick up the rolls of sod from the stacking conveyor and stack the rolls of sod on the pallet, and a control system for controlling the stacking conveyor and the stacking head. The control system may be configured to operate the stacking conveyor and the stacking head to form a first type of layer on the pallet. The first type of layer may include a first set of one or more rolls that is positioned in a first corner of the pallet, a second set of one or more rolls that is positioned in a second corner of the pallet, and a third set of rolls that is positioned in both a third corner and a fourth corner of the pallet. The first corner and the second corner may be on a same side of the pallet, the third corner may be opposite the first corner and the fourth corner may be opposite the second corner. The rolls in the third set may be positioned perpendicular to the one or more rolls in the first set and the one or more rolls in the second set.

In some embodiments, the control system may also be configured to operate the stacking conveyor and the stacking head to form a second type of layer on the pallet. The second type of layer may include a fourth set of one or more rolls that is positioned in the third corner of the pallet, a fifth set of one or more rolls that is positioned in the fourth corner of the pallet, and a sixth set of rolls that is positioned in both the first corner and the second corner of the pallet. The rolls in the sixth set may be positioned perpendicular to the one or more rolls in the fourth set and the one or more rolls in the fifth set.

In some embodiments, the first set, the second set, the fourth set, and the fifth set may each include two rolls.

In some embodiments, the third set and the sixth set may each include five rolls.

In some embodiments, the pallet may be rectangular and the side of the pallet on which the first and second corners are located and the side of the pallet on which the third and fourth corners are located may be longer than other sides of the pallet.

In some embodiments, the rolls in each set may have a width of approximately 24 inches.

In some embodiments, the control system may cause the stacking head to pick up the first set and the second set from a rear pick-up position on the stacking conveyor and to pick up the fourth set and the fifth set from a front pick-up position on the stacking conveyor.

In some embodiments, the stacking head may be configured to stack up to a first number of rolls during a stacking operation and the stacking conveyor may include a second number of roll slots. The second number may be greater than the first number. The control system may cause the stacking head to pick up one or both of the third set or the sixth set from a frontmost set of the roll slots.

In some embodiments, the stacking head may include a first number of roll securing mechanisms and one or both of the first set and the second set may include a second number of rolls. The second number may be less than the first number. The control system may cause the stacking head to pick up one or both of the first set or the second set using a rearmost set of the roll securing mechanisms.

In some embodiments, the control system may cause one or more additional rolls to be positioned on the stacking conveyor when the stacking head picks up one or both of the first set or the second set.

In some embodiments, the control system may create a gap between the one or more additional rolls and the first set or the second set.

In some embodiments, the stacking head may include a first number of roll securing mechanisms and one or both of the fourth set or the fifth set may include a second number of rolls. The second number may be less than the first number. The control system may cause the stacking head to pick up one or both of the fourth set or the fifth set using a frontmost set of the roll securing mechanisms.

In some embodiments, the present invention may be implemented as a method for stacking rolls of sod on a pallet. A first set of one or more rolls may be picked up from a stacking conveyor. The first set may be stacked in a first corner of the pallet. A second set of one or more rolls may be picked up from the stacking conveyor. The second set may be stacked in a second corner of the pallet. The first and second corners may be on a first side of the pallet. A third set of rolls may be picked up from the stacking conveyor. The third set may be stacked on a second side of the pallet opposite the first side. The rolls in the third set may be perpendicular to the one or more rolls in the first set and the one or more rolls in the second set.

In some embodiments, the first and second sets may be picked up from a rear pick-up position.

In some embodiments, a fourth set of one or more rolls may be picked up from the stacking conveyor. The fourth set may be stacked in a third corner of the pallet. A fifth set of one or more rolls may be picked up from the stacking conveyor. The fifth set may be stacked in a fourth corner of the pallet. The third and fourth corners may be on the second side of the pallet. A sixth set of rolls may be picked up from the stacking conveyor. The sixth set may be stacked on the first side of the pallet. The rolls in the sixth set may be perpendicular to the one or more rolls in the fourth set and the one or more rolls in the fifth set.

In some embodiments, the rolls in the third set may span the third and fourth corners and the rolls in the sixth set may span the first and second corners.

In some embodiments, the fourth and fifth sets may be picked up from a front pick-up position.

In some embodiments, the present invention may be implemented as a control system for a sod harvester that includes a stacking conveyor and a stacking head for stacking rolls of sod on a pallet. The control system may be configured to form a first type of layer of rolls on the pallet by causing the stacking head to: pick up a first set of one or more rolls from the stacking conveyor; stack the first set in a first corner of the pallet; pick up a second set of one or more rolls from the stacking conveyor; stack the second set in a second corner of the pallet, the first and second corners being on a first side of the pallet; pick up a third set of rolls from the stacking conveyor; and stack the third set on a second side of the pallet opposite the first side, the rolls in the third set being perpendicular to the one or more rolls in the first set and the one or more rolls in the second set.

In some embodiments, the control system may be configured to form a second type of layer of rolls on the pallet by causing the stacking head to: pick up a fourth set of one or more rolls from the stacking conveyor; stack the fourth set in a third corner of the pallet; pick up a fifth set of one or more rolls from the stacking conveyor; stack the fifth set in a fourth corner of the pallet, the third and fourth corners being on the second side of the pallet; pick up a sixth set of rolls from the stacking conveyor; and stack the sixth set on the first side of the pallet, the rolls in the sixth set being perpendicular to the one or more rolls in the fourth set and the one or more rolls in the fifth set.

In some embodiments, each of the first set, the second set, the fourth set, and the fifth set may include two rolls, and each of the third set and the sixth set may include five rolls.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIGS. 6A-6L provide an example of how the layers shown in FIGS. 5A and 5B can be formed;

FIGS. 8A-8C represent another example of how a stacking conveyor and a stacking head may be operated to stack a set of rolls;

FIGS. 9A-9D represent another example of how a stacking conveyor and a stacking head may be operated to stack a set of rolls.

DETAILED DESCRIPTION

In this specification, the term "sod harvester" should be construed as machinery that is configured to receive and stack sod that has been cut from the ground. This machinery could be in the form of a vehicle, such as a tractor, or in the form of a trailer that is pulled by another vehicle.

Embodiments of the present invention may be implemented to form unique layers of stacked rolls of sod. The structure of the layers can enable wider rolls, such as 24-inch rolls, to be stacked on rectangular pallets, such as pallet 420. However, these layers could be formed on pallets of various sizes and using rolls of various widths.

Figure 5A:
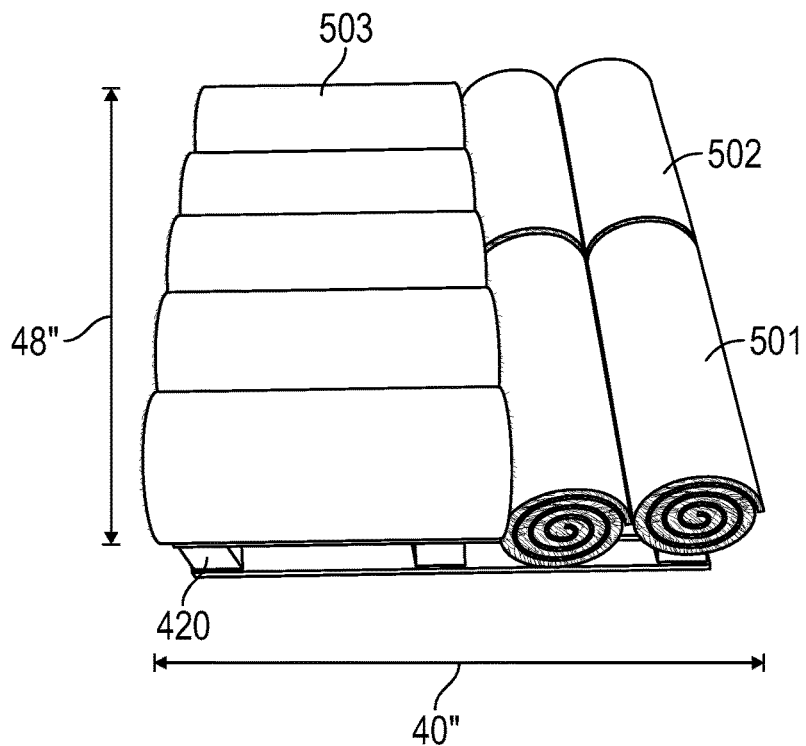
FIGS. 5A and 5B illustrate layers of stacked rolls that can be formed when embodiments of the present invention are implemented.
Figure 5B:
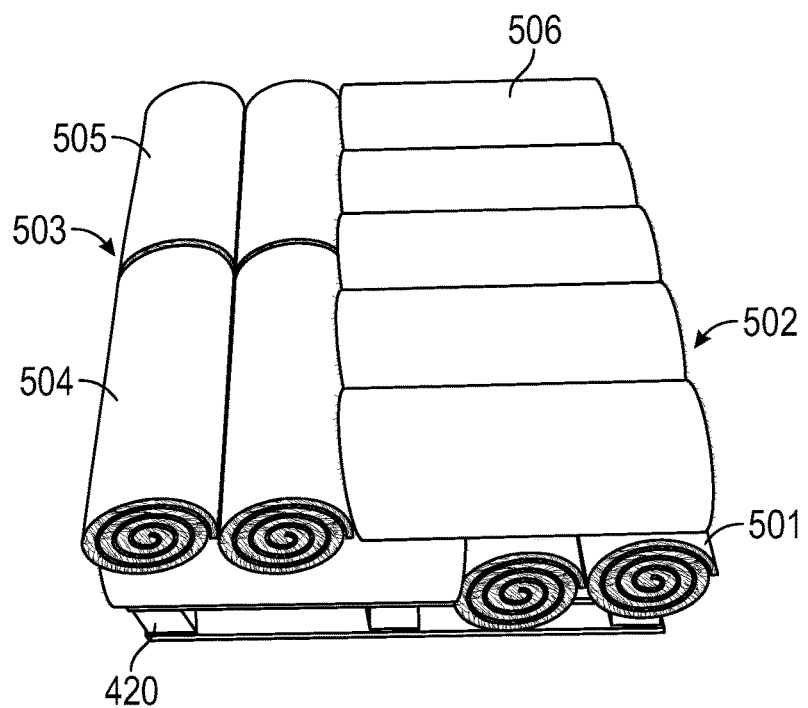

FIGS. 5A and 5B provide examples of a first type of layer and a second type of layer respectively of stacked sod that may be formed using the techniques of the present invention. Each type of layer may include three sets of rolls where each set may include one or more rolls. In this context, the term "set" means one or more rolls that are stacked as part of the same stacking operation.

The first type of layer shown in FIG. 5A includes a first set 501, a second set 502, and a third set 503. In the depicted example, first set 501 and second set 502 each include two rolls and are positioned side-by-side, while third set 503 includes five rolls that are oriented perpendicular to the rolls in first set 501 and second set 502. As indicated, the rolls in first set 501 and second set 502 are oriented so that their widths extend across the longer dimension of the pallet. For example, when stacking on pallet 420, the rolls in first set 501 and second set 502 can be 24 inches wide and may therefore span the full 48" dimension. The combined thickness of the rolls in first set 501 and in second set 502 may be approximately 16 inches thereby leaving 24 inches of pallet 420 to accommodate third set 503, which may also include rolls having widths of 24 inches.

The second type of layer shown in FIG. 5B includes a fourth set 504, a fifth set 505, and a sixth set 506 which may be similar to first set 501, second set 502, and third set 503 respectively but are on opposite sides of pallet 420. However, in some embodiments, fourth set 504 could include a different number of rolls from first set 501, fifth set 505 could include a different number of rolls from second set 502, and sixth set 506 could include a different number of rolls from third set 503. Also, in some embodiments, first set 501 need not have the same number of rolls as second set 502, and fourth set 504 need not have the same number of rolls as fifth set 505. In short, of primary importance are the position of each set within each type of layer and the orientation of the roll(s) within each set, not the number or size of rolls in each set or the size of the pallet.

After forming the second type of layer, the first type of layer could again be formed on top of the second type of layer. Then, the second type of layer could again be formed on top of the first type of layer. In other words, the first and second types of layers can be alternated until the desired number of layers have been formed.

Figure 1:
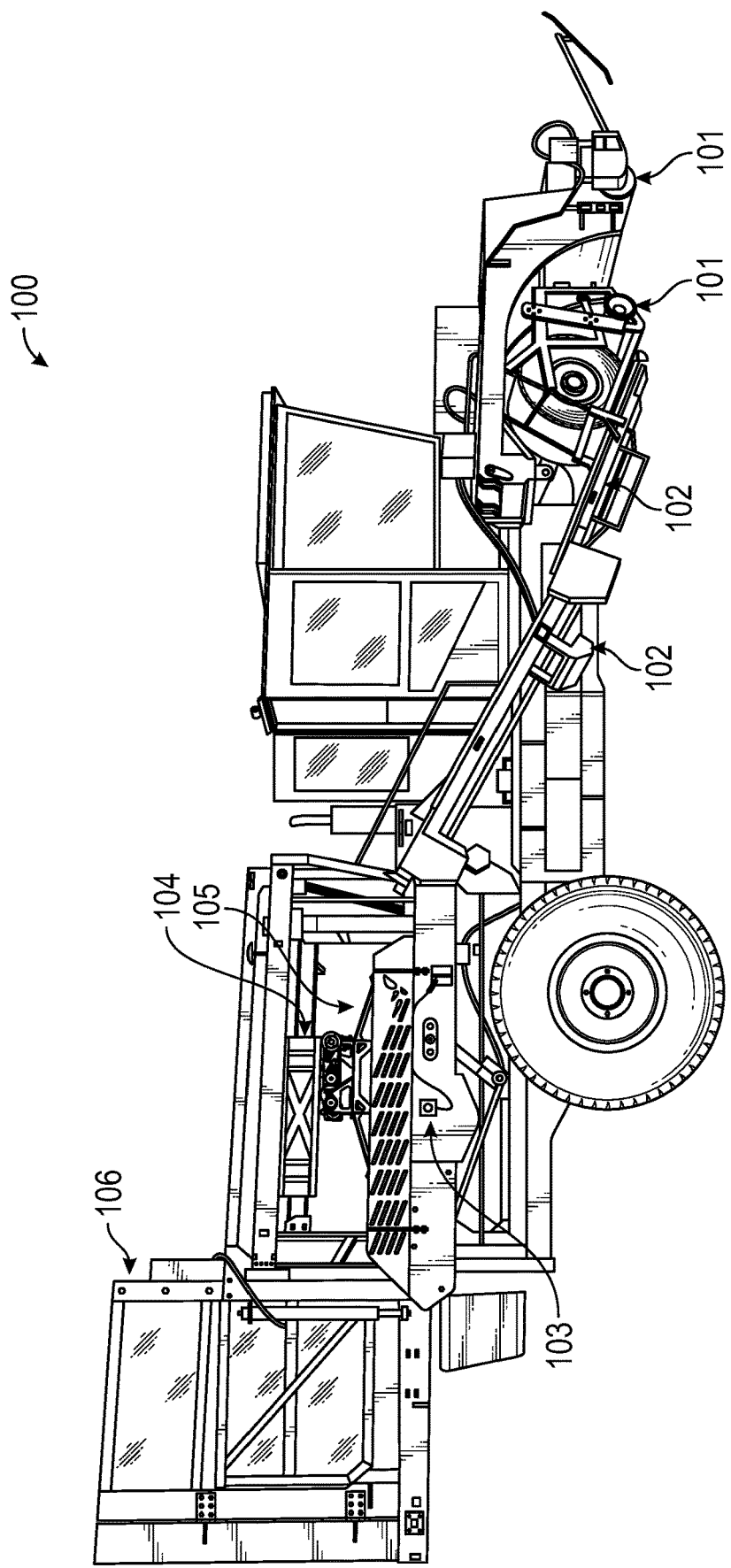
FIG. 1 illustrates a prior art sod harvester that includes a stacking head for stacking slabs of sod.
Figure 2:
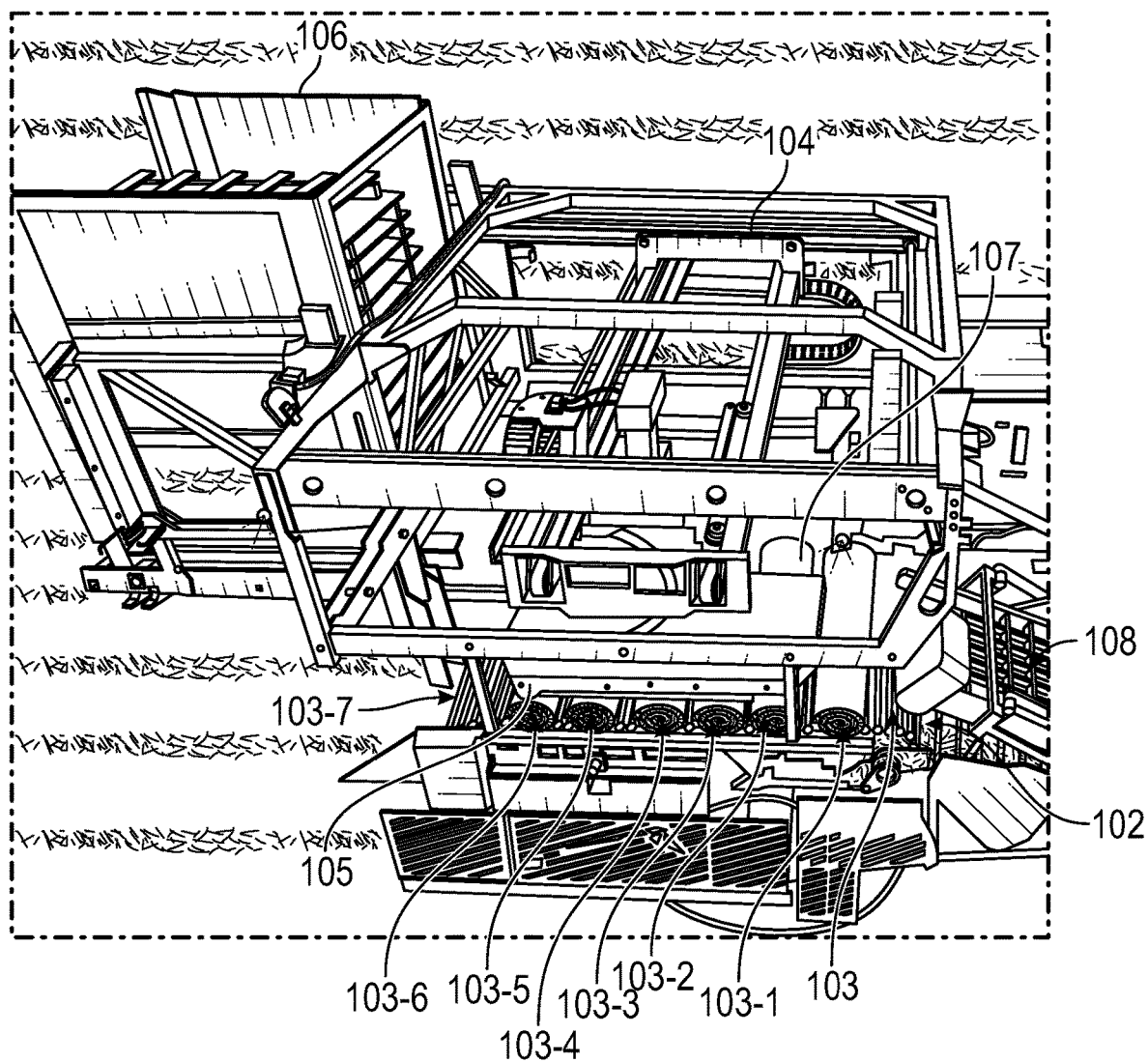
FIG. 2 illustrates a portion of a prior art roll harvester.
Figure 3:
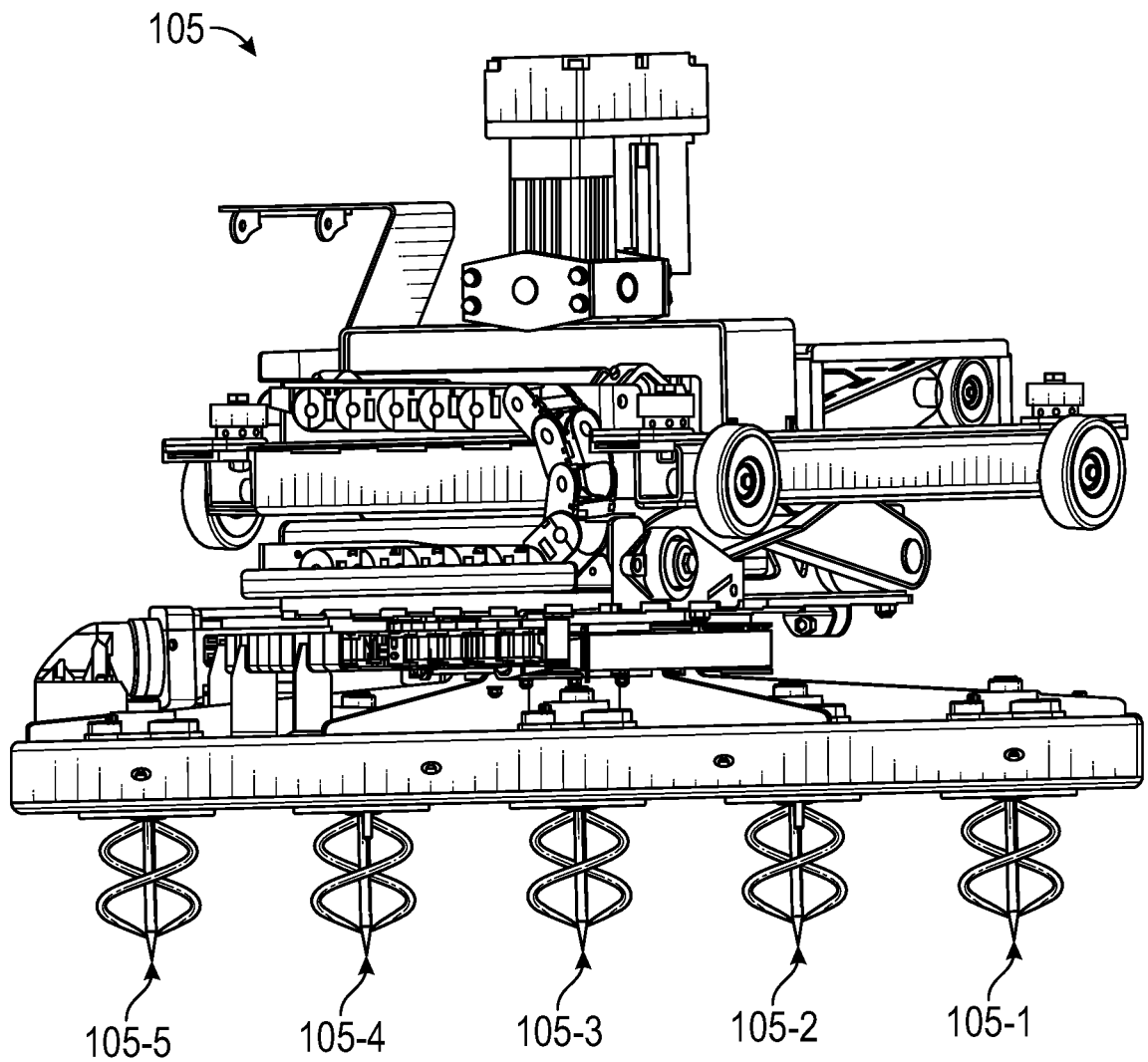
FIG. 3 illustrates a stacking head that may be used on a roll harvester.
Figure 4:
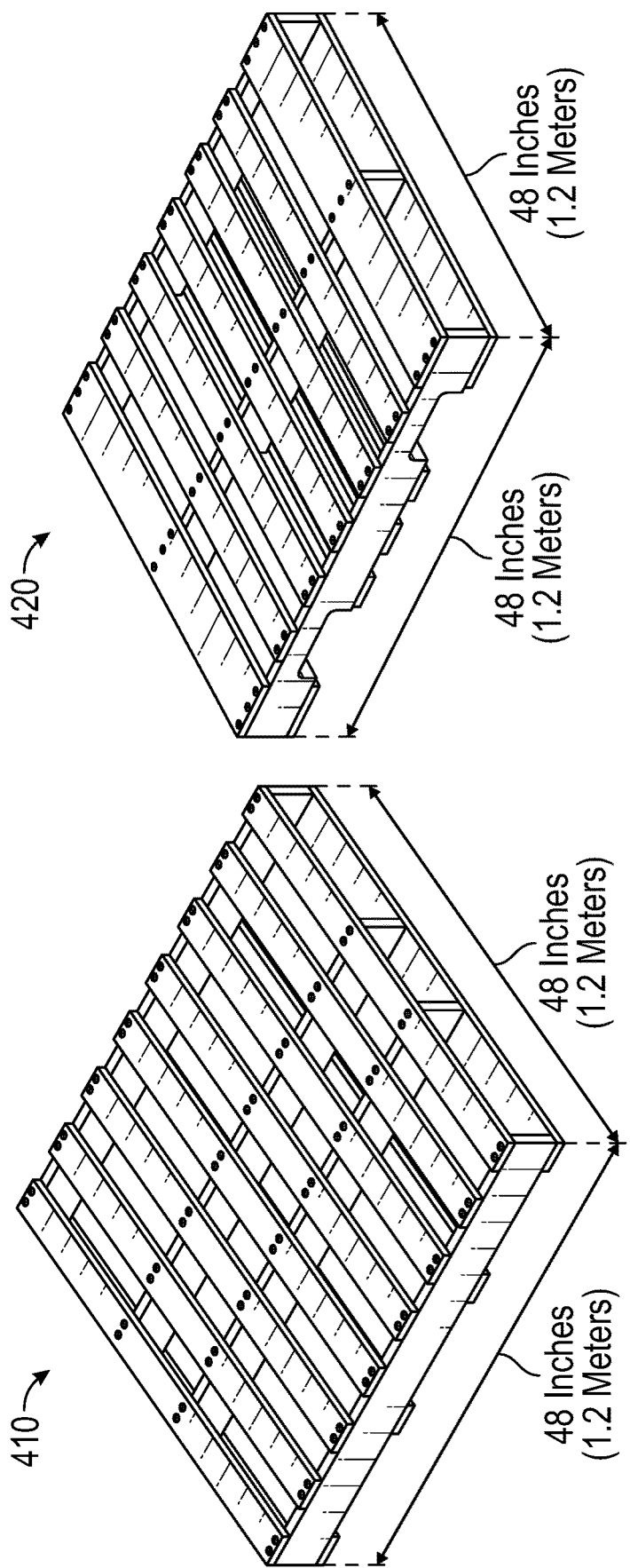
FIG. 4 illustrates square and rectangular pallets that can be used to stack rolls of sod.

FIGS. 6A-6L provide an example of how the first and second types of layers can be formed using the roll harvester shown in FIG. 2. In this example, first set 501, second set 502, fourth set 504, and fifth set 505 have two rolls each while third set 503 and sixth set 506 have five rolls each. However, the same or similar stacking operations/sequence represented in this example could be performed when any or all of the sets have different numbers of rolls.

In FIG. 6A, it is assumed that no rolls have been stacked on pallet 420 (not visible) but two rolls have been advanced onto stacking conveyor 103. These two rolls will form first set 501. As shown, stacking conveyor 103 has been advanced to cause the two rolls to be positioned towards a rear of stacking conveyor 103 such as in roll slots 103-5 and 103-6, and stacking head 105 has descended to secure the rolls while positioned in this "rear pick-up position." To cause the rolls in first set 501 to be positioned in the rear pick-up position, stacking conveyor 103 could accumulate the rolls in roll slots 103-1 and 103-2 and then advance them to roll slots 103-5 and 103-6 or other rearward roll slots.

After securing the rolls in first set 501 in the rear pick-up position (e.g., using roll securing mechanisms 105-4 and 105-5), stacking head 105 can travel overtop pallet 420 without rotating so that the rolls in first set 501 are oriented parallel to the longer dimension of pallet 420 and positioned in or towards a first corner of the pallet. In the depicted example, this first corner is the rear, left corner relative to roll harvester 100 and pallet 420 is oriented so that its longer dimension extends along the width of roll harvester 100. Notably, if pallet 420 is oriented in a different manner relative to stacking conveyor 103, stacking head 105 could be moved/rotated as necessary to position first set 501 in the intended position. Once stacking head 105 has positioned first set 501, it can release the rolls in first set 501 onto pallet 420 and return to pick up second set 502 in a/the rear pick-up position.

Figure 6D:
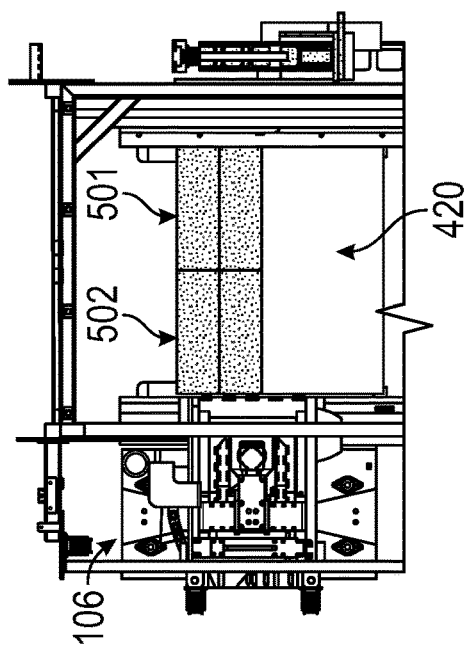
Figure 6C:
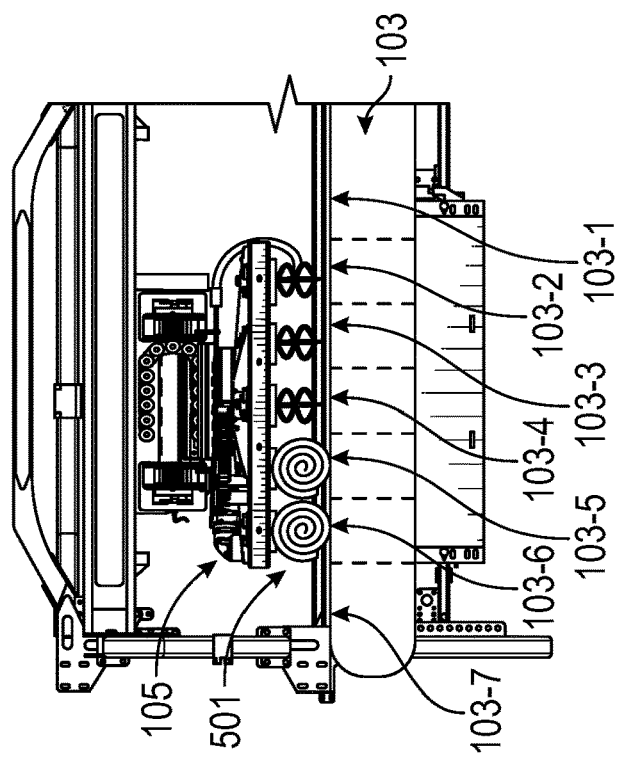

FIGS. 6C and 6D show how second set 502 can be picked up from stacking conveyor 103 and stacked on pallet 420. The stacking operation for second set 502 can be similar to the stacking operation for first set 501 except that second set 502 is stacked alongside first set 501 at or towards the opposite end of the longer dimension of pallet 420 from first set 501 in a second corner. In the depicted example, the second corner is the rear, right corner. Once stacking head 105 has positioned second set 502, it can release them onto pallet 420 and return to pick up third set 503. Notably, in the depicted example, the order of stacking first set 501 and second set 502 could be reversed.

Figure 6F:
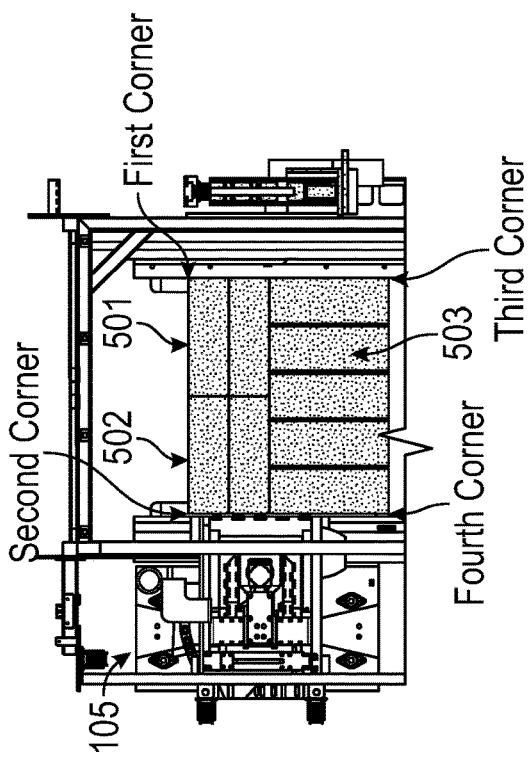
Figure 6E:
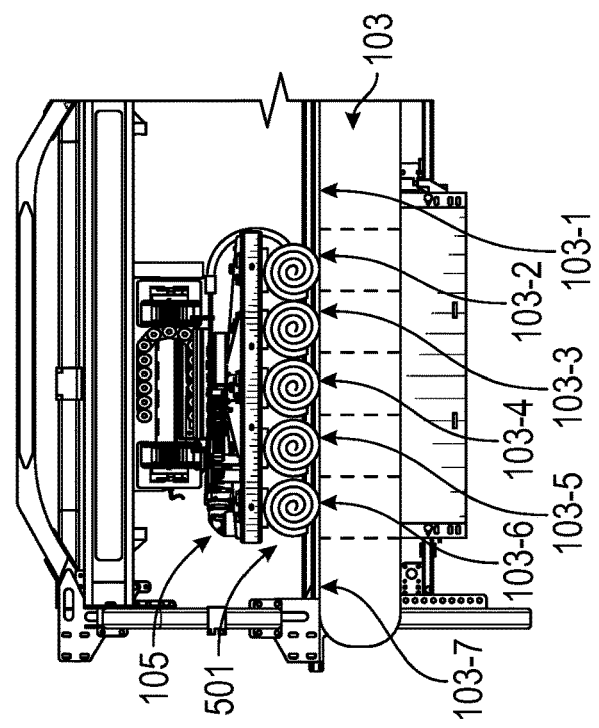

FIG. 6E and 6F show how third set 503 can be picked up from stacking conveyor 103 and stacked on pallet 420. Because third set 503 includes five rolls in this example, stacking conveyor 103 can accumulate five rolls such as in roll slots 103-2 through 103-6. Then, stacking head 105 can secure the rolls in third set 503 and travel overtop pallet 420 while rotating 90 degrees so that the rolls are perpendicular to the rolls in first set 501 and second set 502 and positioned at or towards the opposite side of the shorter dimension of pallet 420 from first set 501 and second set 502. In other words, third set 503 can span both a third corner of pallet 420 opposite from the first corner and a fourth corner of pallet 420 opposite from the second corner as labelled in FIG. 6F. Stacking head 105 may then release the rolls in third set 503 and return to pick up fourth set 504. At this point, the first type of layer will have been formed.

FIG. 6G and 6H show how fourth set 504 can be picked up from stacking conveyor 103 and stacked on pallet 420. In FIG. 6G, two rolls that will form fourth set 504 have been accumulated towards a front of stacking conveyor 103 such as in roll slots 103-2 and 103-3 and stacking head 105 has descended to secure the rolls while positioned in this "front pick-up position."

After securing the rolls in fourth set 504 in the front pick-up position (e.g., using roll securing mechanisms 105-1 and 105-2), stacking head 105 can travel overtop pallet 420 without rotating so that the rolls in fourth set 504 are oriented parallel to the longer dimension of pallet 420 and positioned in or towards the third corner of pallet 420. In the depicted example, this third corner is the front, left corner. Once stacking head 105 has positioned fourth set 504, it can release the rolls onto pallet 420 and return to pick up fifth set 505 in a/the front pick-up position.

Figure 6J:
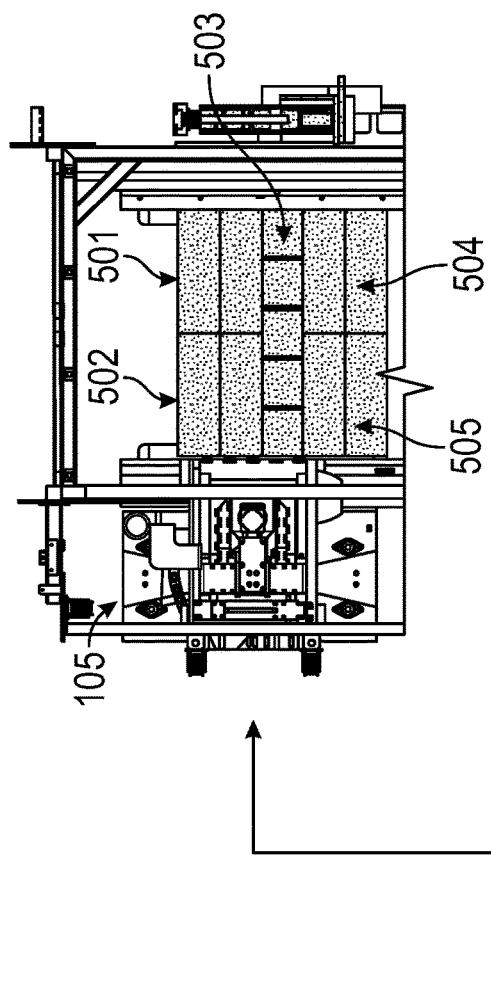
Figure 6I:
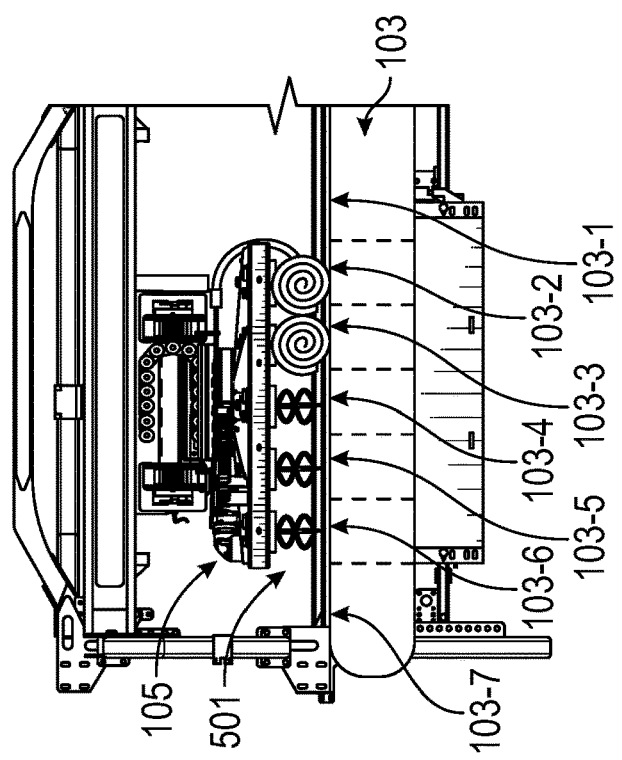

FIGS. 6I and 6J show how fifth set 505 can be picked up from stacking conveyor 103 and stacked on pallet 420. The stacking operation for fifth set 505 can be similar to the stacking operation for fourth set 504 except that fifth set 505 is stacked at or towards the fourth corner of pallet 420. In the depicted example, the fourth corner is the front, right corner. Once stacking head 105 has positioned fifth set 505, it can release the rolls onto pallet 420 and return to pick up sixth set 506. Notably, in the depicted example, the order of stacking fourth set 504 and fifth set 505 could be reversed.

Figure 6L:
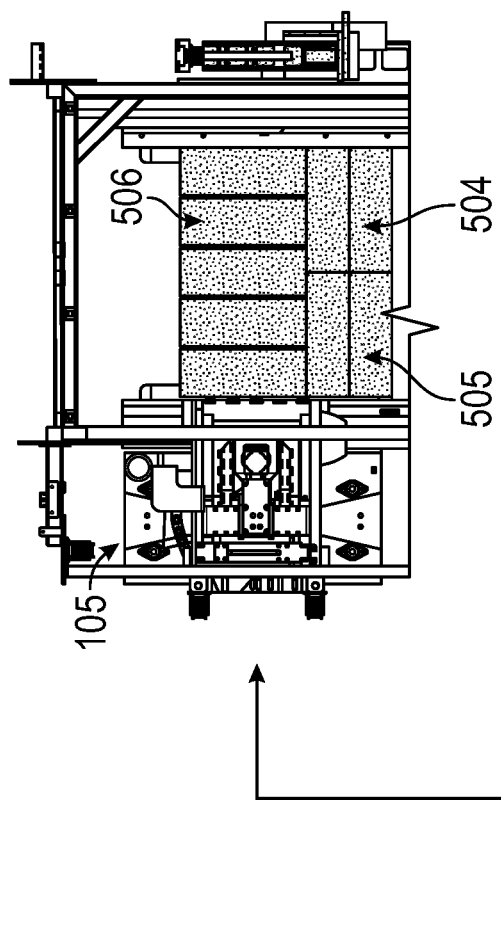
Figure 6K:
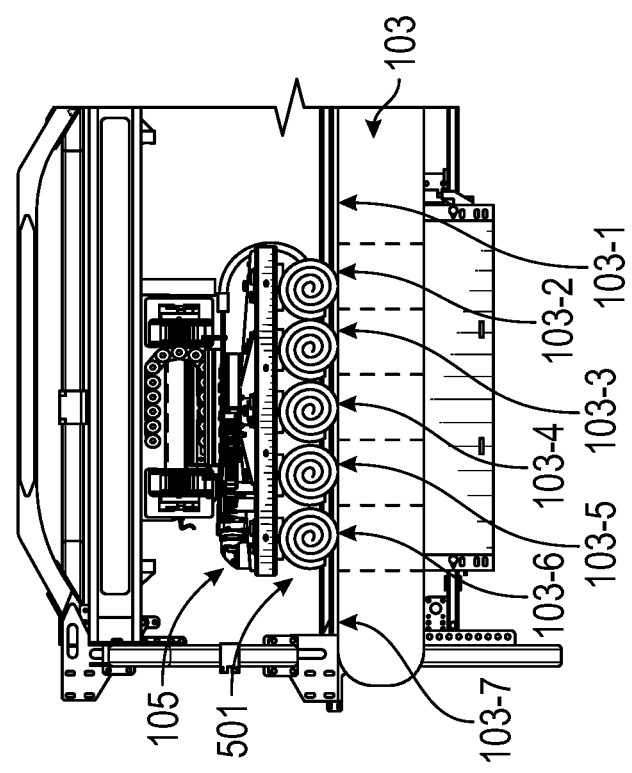

FIG. 6K and 6L show how sixth set 506 can be picked up from stacking conveyor 103 and stacked on pallet 420. Because sixth set 506 includes five rolls in this example, stacking conveyor 103 can accumulate five rolls such as in roll slots 103-2 through 103-6. Then, stacking head 105 can secure the rolls in sixth set 506 and travel overtop pallet 420 while rotating 90 degrees so that the rolls are perpendicular to the rolls in fourth set 504 and fifth set 505 and positioned at or towards the opposite side of the shorter dimension of pallet 420 from fourth set 504 and fifth set 505. In other words, sixth set 506 can span both the first and second corners of pallet 420. Stacking head 105 may then release the rolls in sixth set 506. At this point, the second type of layer will have been formed. Additional first and second types of layers could be formed as desired using the same sequence of stacking operations.

FIGS. 7A-7B, 8A-8C, 9A-9D, and 10A-10B each provide examples of how stacking conveyor 103 and stacking head 105 may be controlled to perform the stacking operations for forming the first and second types of layers.

Figure 7B:
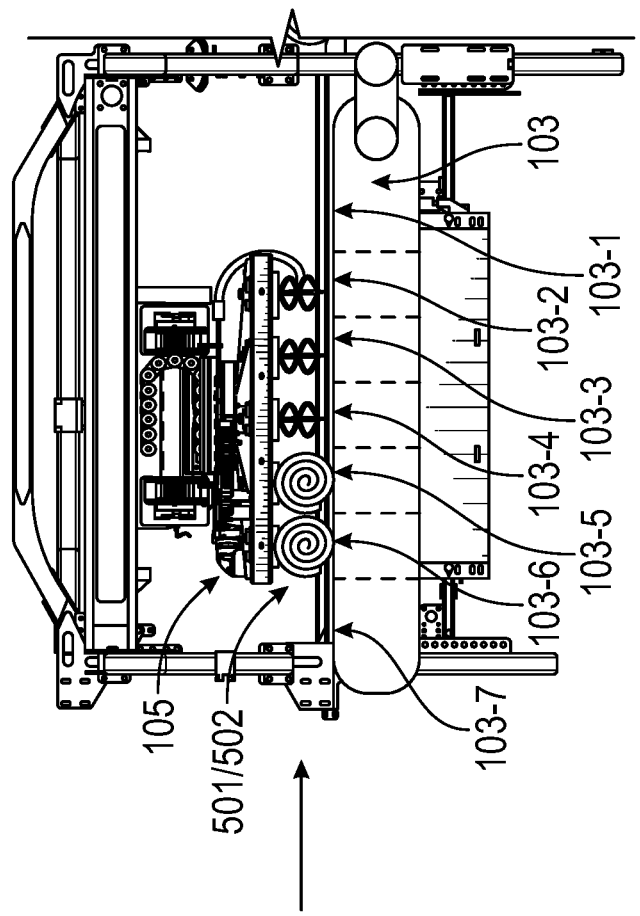
FIGS. 7A and 7B represent one example of how a stacking conveyor and a stacking head may be operated to stack a set of rolls.
Figure 7A:
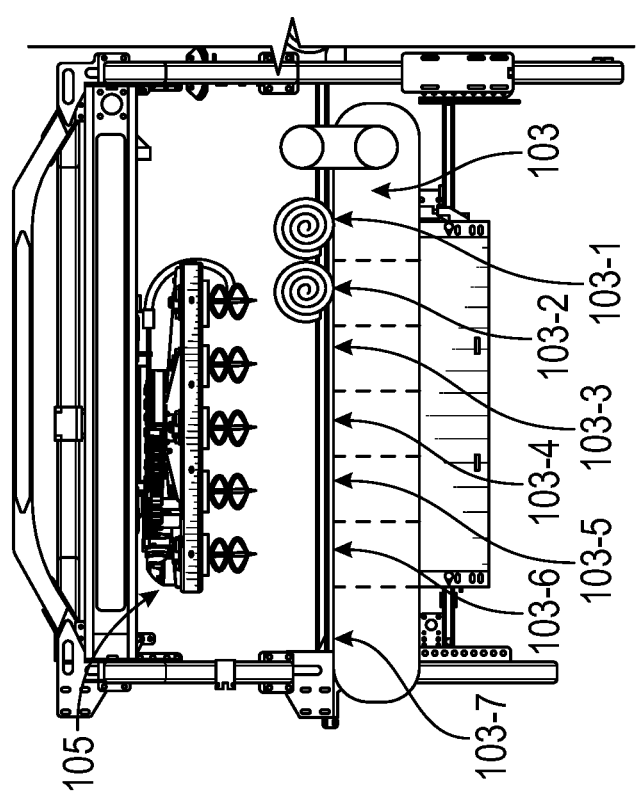

FIGS. 7A and 7B provide an example of how rolls for first set 501 or second set 502 may be handled. In FIG. 7A, stacking conveyor 103 has just been advanced to receive a second roll while a first roll was already positioned in roll slot 103-1. Accordingly, the two rolls are accumulated in rolls slots 103-1 and 103-2. Once the second roll is advanced onto stacking conveyor 103, stacking conveyor 103 may be advanced to cause the rolls to be in roll slots 103-5 and 103-6 (a rear pick-up position) from which stacking head 105 may pick them up as represented in FIG. 7B. In some cases, stacking conveyor 103 could be configured to advance the rolls into roll slots 103-6 and 103-7 (e.g., as part of advancing another roll into roll slot 103-1). In such cases, stacking head 105 could pick up the rolls from roll slots 103-6 and 103-7 (another rear pick-up position). Also, in some cases, stacking conveyor 103 may advance the rolls into roll slots 103-6 and 103-7 while stacking head 105 is picking up the rolls. In some cases, stacking conveyor 103 and stacking head 105 could be configured to pick up the rolls of first set 501 and second set 502 from roll slots 103-4 and 103-5 (another rear pick-up position). In short, a rear pick-up position should be considered a position that is at or towards the rear of the available pick-up positions. Also, stacking head 105 would typically use rearward roll securing mechanisms (e.g., roll securing mechanisms 105-4 and 105-5) when picking up first set 501 and second set 502 from a rear pick-up position.

FIGS. 8A-8C provide another example of how rolls for first set 501 or second set 502 may be handled. In this example, the two rolls are initially advanced into roll slots 103-4 and 103-5 and then held in that position until another roll is ready to be advanced onto stacking conveyor 103. Then, stacking conveyor 103 is advanced to cause the accumulated rolls to be in roll slots 103-5 and 103-6 from which they are picked up and to cause another roll to be advanced into roll slot 103-1. This technique can be used to allow sod harvester 100 to operate at a faster speed. In particular, harvesting does not need to be slowed to allow stacking head 105 to be able to remove first set 501 or second set 502 from stacking conveyor 103 prior to the next roll being advanced onto stacking conveyor 103.

FIGS. 9A-9D provide another example of how rolls for first set 501 or second set 502 may be handled. In comparison to the example in FIGS. 8A-8C, in this example, stacking conveyor 103 is advanced another time to cause the accumulated rolls to be in slots 103-6 and 103-7 from which they are picked up and to cause an additional roll to be advanced onto stacking conveyor 103 (causing two rolls to also be in roll slots 103-1 and 103-2). This additional advancing of stacking conveyor 103 could be performed before or while stacking head 105 secures first set 501 or second set 502. In short, in a scenario where stacking head 105 includes five sets of roll securing mechanisms, stacking conveyor 103 may be advanced to create a gap spanning at least three roll slots between first set 501 or second set 502 and the next roll(s).

Figure 10B:
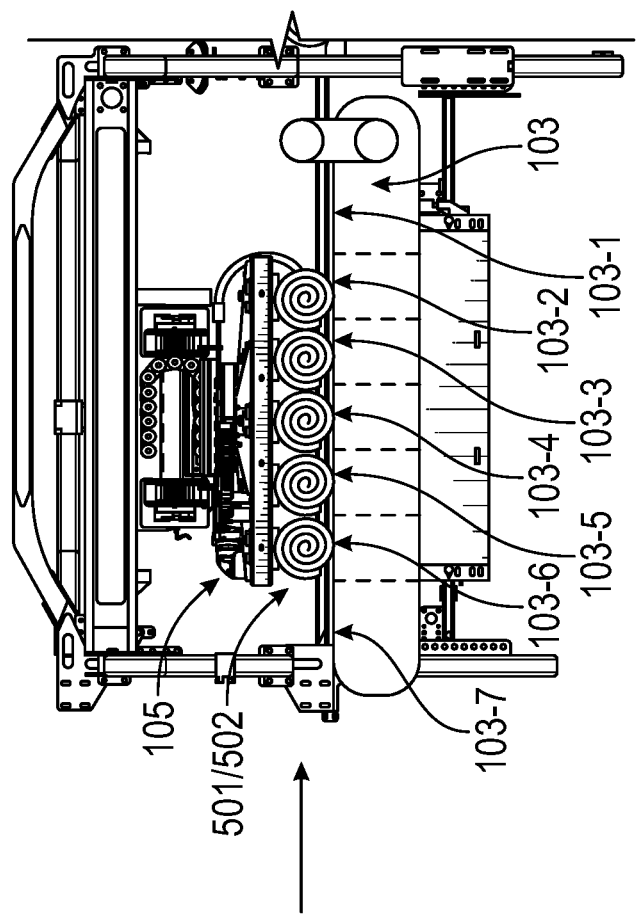
FIGS. 10A and 10B represent another example of how a stacking conveyor and a stacking head may be operated to stack a set of rolls.
Figure 10A:
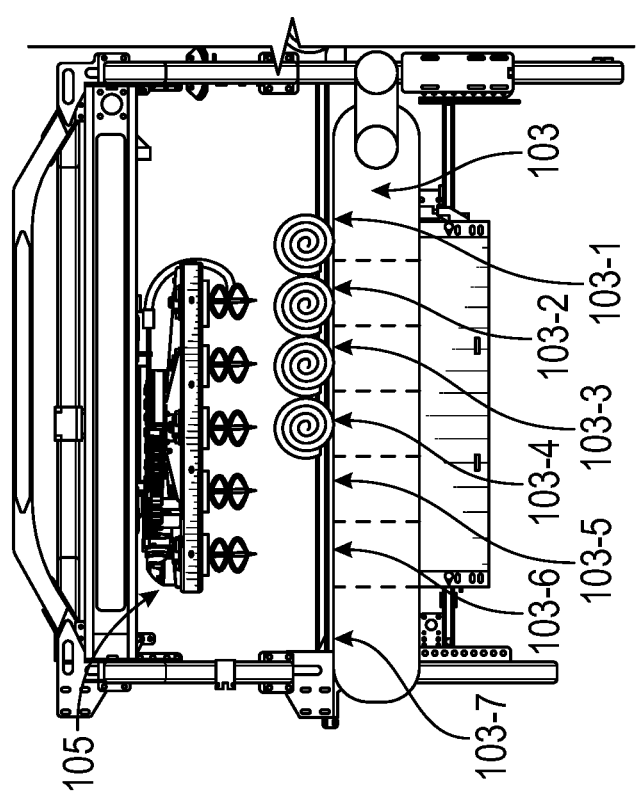

FIGS. 10A and 10B provide an example of how third set 503 and sixth set 506 may be handled. Because these sets may include a full set of rolls (e.g., five rolls), it is likely that stacking head 105 may complete a prior stacking operation before third set 503 or sixth set 506 is accumulated. Therefore, stacking conveyor 103 and stacking head 105 may be configured to pick up third set 503 and sixth set 506 as early as possible such as by accumulating and picking up the rolls in roll slots 103-1 through 103-5. By commencing the stacking operation for third set 503 and sixth set 506 at the earliest possible time, stacking head 105 will be available to pick up fourth set 504 or first set 501 respectively earlier thus minimizing the amount by which harvesting may need to be slowed to accommodate the unique stacking operations for forming the first and second types of layers.

Although not shown, stacking head 105 may pick up fourth set 504 and fifth set 505 from any front pick-up position without needing to create a gap between subsequent rolls. This front pick-up position may typically be roll slots 103-2 and 103-3 but could also include roll slots 103-3 and 103-4 or roll slots 103-1 and 103-2.

A sod harvester may include a control system for causing stacking conveyor 103 and stacking head 105 to perform the above-described stacking operations. The term "control system" should encompass any combination of hardware and/or software. For example, a control system may be hardwareand/or software-based circuitry including, but not limited to, a central processing unit, a microprocessor, a microcontroller, a field programming gate array, an application-specific integrated circuit, a system on a chip, etc. The term "approximately" should mean within 5% of the stated value.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A method for stacking sod using a sod harvester, the sod harvester comprising:
    a pallet support assembly that is configured to support a pallet;
    a stacking conveyor that is configured to receive rolls of sod;
    a stacking head that is configured to pick up the rolls of sod from the stacking conveyor and stack the rolls of sod on the pallet, the stacking head including a first number of roll securing mechanisms, each roll securing mechanism being configured to remove a single roll from the stacking conveyor such that the stacking head is configured to remove up to the first number of rolls from the stacking conveyor and to stack up to the first number of rolls on the pallet as part of a single stacking operation; and
    a control system for controlling the stacking conveyor and the stacking head;
    wherein the method is implemented by the control system and comprises:
        operating the stacking conveyor and the stacking head to form a first type of layer on the pallet by:
            advancing a first set of one or more rolls on the stacking conveyor to a rear pick-up position, the first set including less than the first number of rolls;
            removing the first set of one or more rolls from the stacking conveyor using a rearmost set of one or more of the roll securing mechanisms while a remaining frontmost set of the roll securing mechanisms is not used to remove rolls from the stacking conveyor;
            stacking the first set of one or more rolls in a first corner of the pallet;
            advancing a second set of one or more rolls on the stacking conveyor to the rear pick-up position, the second set including less than the first number of rolls;
            removing the second set of one or more rolls from the stacking conveyor using the rearmost set of one or more of the roll securing mechanisms while the remaining frontmost set of the roll securing mechanisms is not used to remove rolls from the stacking conveyor;
            stacking the second set of one or more rolls in a second corner of the pallet;
            advancing a third set of rolls on the stacking conveyor, the third set of rolls including the first number of rolls;
            removing the third set of rolls from the stacking conveyor using the roll securing mechanisms of the stacking head; and
            stacking the third set of rolls in a third corner and a fourth corner of the pallet;
            wherein the first corner and the second corner are on a same side of the pallet, the third corner is opposite the first corner and the fourth corner is opposite the second corner, and wherein the rolls in the third set are positioned perpendicular to the one or more rolls in the first set and the one or more rolls in the second set.

2. The method of claim 1, further comprising:
    operating the stacking conveyor and the stacking head to form a second type of layer on the pallet by:
        advancing a fourth set of one or more rolls on the stacking conveyor, the fourth set including less than the first number of rolls;
        removing the fourth set of one or more rolls from the stacking conveyor by either using the rearmost set of one or more of the roll securing mechanisms while the remaining frontmost set of the roll securing mechanisms is not used to remove rolls from the stacking conveyor or using a frontmost set of one or more of the roll securing mechanisms while a remaining rearmost set of the roll securing mechanisms is not used to remove rolls from the stacking conveyor;
        stacking the fourth set of one or more rolls in the third corner of the pallet;
        advancing a fifth set of one or more rolls on the stacking conveyor, the fifth set including less than the first number of rolls;
        removing the fifth set of one or more rolls from the stacking conveyor by either using the rearmost set of one or more of the roll securing mechanisms while the remaining frontmost set of the roll securing mechanisms is not used to remove rolls from the stacking conveyor or using the frontmost set of one or more of the roll securing mechanisms while the remaining rearmost set of the roll securing mechanisms is not used to remove rolls from the stacking conveyor;
        stacking the fifth set of one or more rolls in the fourth corner of the pallet;
        advancing a sixth set of rolls on the stacking conveyor, the sixth set of rolls including the first number of rolls;
        removing the sixth set of rolls from the stacking conveyor using the roll securing mechanisms of the stacking head; and
        stacking the sixth set of rolls in the first corner and the second corner of the pallet;
        wherein the rolls in the sixth set are positioned perpendicular to the one or more rolls in the fourth set and the one or more rolls in the fifth set.

3. The method of claim 2, wherein the first set, the second set, the fourth set, and the fifth set each include two rolls.

4. The method of claim 2, wherein the first number is five.

5. The method of claim 1, wherein the pallet is rectangular and the side of the pallet on which the first and second corners are located and the side of the pallet on which the third and fourth corners are located are longer than other sides of the pallet.

6. The method of claim 1, wherein the rolls in each set have a width of approximately 24 inches.

7. The method of claim 2, wherein the stacking conveyor includes a second number of roll slots, the second number being greater than the first number, wherein the control system causes the stacking head to pick up one or both of the third set or the sixth set from a frontmost set of the roll slots.

8. The method of claim 2, wherein the fourth set of one or more rolls and the fifth set of one or more rolls are removed from the stacking conveyor using the frontmost set of one or more of the roll securing mechanisms while the remaining rearmost set of the roll securing mechanisms is not used to remove rolls from the stacking conveyor.

9. The method of claim 8, comprising:
causing one or more additional rolls to be positioned on the stacking conveyor when the stacking head picks up one or both of the first set or the second set.

10. The method of claim 9, further comprising:
creating a gap between the one or more additional rolls and the first set or the second set.

11. The method of claim 1, wherein the first and second sets are stacked before the third set.

12. A method, implemented by a sod harvester having a stacking conveyor and a stacking head, for stacking rolls of sod on a pallet using the stacking head that is configured to pick up rolls of sod from the stacking conveyor and stack the rolls of sod on the pallet, the stacking head including a first number of roll securing mechanisms, each roll securing mechanism being configured to remove a single roll from the stacking conveyor such that the stacking head is configured to remove up to the first number of rolls from the stacking conveyor and to stack up to the first number of rolls on the pallet as part of a single stacking operation, the method comprising:
forming a first type of layer on the pallet by:
advancing a first set of one or more rolls on the stacking conveyor to a rear pick-up position, the first set including less than the first number of rolls;
removing the first set of one or more rolls from the stacking conveyor using a rearmost set of one or more of the roll securing mechanisms while a remaining frontmost set of the roll securing mechanisms is not used to remove rolls from the stacking conveyor;
stacking the first set of one or more rolls in a first corner of the pallet;
advancing a second set of one or more rolls on the stacking conveyor to the rear pick-up position, the second set including less than the first number of rolls;
removing the second set of one or more rolls from the stacking conveyor using the rearmost set of one or more of the roll securing mechanisms while the remaining frontmost set of the roll securing mechanisms is not used to remove rolls from the stacking conveyor;
stacking the second set of one or more rolls in a second corner of the pallet;
advancing a third set of rolls on the stacking conveyor, the third set of rolls including the first number of rolls;
removing the third set of rolls from the stacking conveyor using the roll securing mechanisms of the stacking head; and
stacking the third set of rolls in a third corner and a fourth corner of the pallet;
wherein the first corner and the second corner are on a same side of the pallet, the third corner is opposite the first corner and the fourth corner is opposite the second corner, and wherein the rolls in the third set are positioned perpendicular to the one or more rolls in the first set and the one or more rolls in the second set.

13. The method of claim 12, further comprising:
forming a second type of layer on the pallet by:
advancing a fourth set of one or more rolls on the stacking conveyor, the fourth set including less than the first number of rolls;
removing the fourth set of one or more rolls from the stacking conveyor by either using the rearmost set of one or more of the roll securing mechanisms while the remaining frontmost set of the roll securing mechanisms is not used to remove rolls from the stacking conveyor or using a frontmost set of one or more of the roll securing mechanisms while a remaining rearmost set of the roll securing mechanisms is not used to remove rolls from the stacking conveyor;
stacking the fourth set of one or more rolls in the third corner of the pallet;
advancing a fifth set of one or more rolls on the stacking conveyor, the fifth set including less than the first number of rolls;
removing the fifth set of one or more rolls from the stacking conveyor by either using the rearmost set of one or more of the roll securing mechanisms while the remaining frontmost set of the roll securing mechanisms is not used to remove rolls from the stacking conveyor or using the frontmost set of one or more of the roll securing mechanisms while the remaining rearmost set of the roll securing mechanisms is not used to remove rolls from the stacking conveyor;
stacking the fifth set of one or more rolls in the fourth corner of the pallet;
advancing a sixth set of rolls on the stacking conveyor, the sixth set of rolls including the first number of rolls;
removing the sixth set of rolls from the stacking conveyor using the roll securing mechanisms of the stacking head; and
stacking the sixth set of rolls in the first corner and the second corner of the pallet;
wherein the rolls in the sixth set are positioned perpendicular to the one or more rolls in the fourth set and the one or more rolls in the fifth set.

14. The method of claim 13, wherein the first set, the second set, the fourth set, and the fifth set each include two rolls.

15. The method of claim 12, wherein the stacking conveyor includes a second number of roll slots, the second number being greater than the first number, and wherein the rear pick-up position includes a rearmost set of one or more of the rolls slots.

16. The method of claim 13, wherein the stacking conveyor includes a second number of roll slots, the second number being greater than the first number, and wherein the rear pick-up position includes a rearmost set of one or more of the rolls slots, and wherein the fourth and fifth sets are removed from the stacking conveyor from the rear pick-up position.

17. The method of claim 16, wherein the third and sixth sets are removed from the stacking conveyor from a front pick-up position that includes a frontmost set of the first number of roll slots.

18. The method of claim 12, wherein the first and second sets are stacked before the third set.

19. The method of claim 13, wherein the fourth and fifth sets are stacked before the sixth set.

20. The method of claim 12, further comprising:
causing one or more additional rolls to be positioned on the stacking conveyor when the stacking head picks up one or both of the first set or the second set; and
creating a gap between the one or more additional rolls and the first set or the second set.

* * * * *